United States Patent
Scaggs

Patent Number: 5,557,630
Date of Patent: Sep. 17, 1996

[54] UNSTABLE LASER RESONATOR

[76] Inventor: Michael J. Scaggs, 1019 Valley Rd., Mason, N.H. 03048

[21] Appl. No.: 372,378

[22] Filed: Jan. 13, 1995

[51] Int. Cl.⁶ .................................................. H01S 3/08
[52] U.S. Cl. .................. 372/95; 372/99; 372/92; 372/98
[58] Field of Search ............... 372/99, 95, 98, 372/92

[56] References Cited

U.S. PATENT DOCUMENTS

| | | | |
|---|---|---|---|
| 3,824,487 | 7/1974 | Bucznek et al. | |
| 3,873,942 | 3/1975 | Reilly | |
| 3,889,208 | 6/1975 | Itzkan | |
| 3,909,744 | 9/1975 | Wisner et al. | |
| 3,921,096 | 11/1975 | Chenausky et al. | |
| 3,930,712 | 1/1976 | Boughton et al. | |
| 3,969,685 | 7/1976 | Chenausky et al. | |
| 4,025,172 | 5/1977 | Freiberg | |
| 4,079,340 | 3/1978 | Weiner et al. | |
| 4,123,149 | 10/1978 | Chenausky et al. | |
| 4,126,381 | 11/1978 | Chodzko et al. | |
| 4,135,787 | 1/1979 | McLafferty | |
| 4,151,487 | 4/1979 | Chi | |
| 4,164,366 | 8/1979 | Sziklas et al. | |
| 4,170,405 | 10/1979 | Sziklas | |
| 4,214,216 | 7/1980 | Jones, Jr. | |
| 4,310,808 | 1/1982 | Byer et al. | |
| 4,354,271 | 10/1982 | Hon | |
| 4,360,925 | 11/1982 | Brosnan et al. | 372/95 |
| 4,361,889 | 11/1982 | Johnson | |
| 4,401,876 | 8/1983 | Cooper | |
| 4,423,511 | 12/1983 | Morton | |
| 4,433,418 | 2/1984 | Smith | |
| 4,446,559 | 5/1984 | von Bieren | |
| 4,491,950 | 1/1985 | Hoffmann | |
| 4,494,235 | 1/1985 | Guch, Jr. et al. | |
| 4,553,244 | 11/1985 | Benedict et al. | |
| 4,559,627 | 12/1985 | Chun | |
| 4,633,479 | 12/1986 | Trageser | |
| 4,646,314 | 2/1987 | Opower | |
| 4,664,517 | 5/1987 | Guthrie et al. | |
| 4,713,818 | 12/1987 | Lee | |
| 4,715,040 | 12/1987 | Lee | |
| 4,717,842 | 1/1988 | Komine | |
| 4,719,639 | 1/1988 | Tulip | |
| 4,731,788 | 3/1988 | Shoshan | |
| 4,731,794 | 3/1988 | Schäfer | |
| 4,745,618 | 5/1988 | Burger | |
| 4,769,614 | 9/1988 | Oughstun | |
| 4,772,121 | 9/1988 | Trageser | |
| 4,787,092 | 11/1988 | Gobbi et al. | |
| 4,792,765 | 12/1988 | Smith et al. | |
| 4,803,696 | 2/1989 | Pepper et al. | |
| 4,918,704 | 4/1990 | Caprara et al. | 372/95 |
| 4,942,588 | 7/1990 | Yasui et al. | 372/95 |
| 4,953,175 | 8/1990 | De Silvestri et al. | 372/95 |
| 4,961,201 | 10/1990 | Opower | |
| 5,012,483 | 4/1991 | Reintjes et al. | 372/95 |
| 5,043,998 | 8/1991 | Cooper et al. | |
| 5,058,123 | 10/1991 | Yasui et al. | 372/95 |
| 5,065,407 | 11/1991 | Pax | |
| 5,097,479 | 3/1992 | Opower | |
| 5,123,028 | 6/1992 | Hobart et al. | |
| 5,199,042 | 3/1993 | Papetti et al. | |
| 5,237,149 | 8/1993 | Macken | |
| 5,260,964 | 11/1993 | Morin et al. | |
| 5,390,211 | 2/1995 | Clark et al. | 372/95 |

*Primary Examiner*—Leon Scott, Jr.

[57] ABSTRACT

The present invention is directed to an unstable laser resonator. The present invention includes a first mirror located adjacent one end of a laser gain medium, and a second output mirror/lens where one surface acts as a mirror and the other surface acts as a collimating lens located adjacent an opposite end of a laser gain medium. Both mirrors include combinations of convex, concave and plano surfaces in order to achieve small fresnel number light with diffraction limited light properties and high energy extraction associated with a large fresnel number. The output coupler provides a means to extract and collimate the light out of the cavity and feedback into the laser gain medium high quality laser light for sustaining the diffraction limited performance while the gain medium is excited.

8 Claims, 6 Drawing Sheets

UNSTABLE LASER RESONATOR

BACKGROUND AND SUMMARY OF THE INVENTION

The present invention is directed to lasers and, more particularly, the present invention is directed to an unstable laser resonator.

Unstable laser resonators typically include an excitation source, a gain or lasing medium and a pair of reflecting mirrors, all of which make up a laser cavity. The excitation source generates photons within the gain medium, some of which travel along the axis of the gain medium and are reflected back toward the gain medium by the opposing mirrors for subsequent amplification. In an unstable laser resonator, the diameter of the light is allowed to increase as it travels back and forth within the cavity. A portion of the light whose dimensions exceed a certain value is extracted to form the output beam. Many unstable laser resonator techniques employed require complex optical schemes and filter methods that are inefficient and cumbersome to align. One common and simple method is the confocal unstable laser resonator, which includes a combination of a concave high reflecting mirror positioned at one end of the laser cavity, and a meniscus lens with convex surfaces at the opposite end of the laser cavity. Although the light output from a confocal unstable laser resonator is collimated, it is difficult to achieve diffraction limited output, primarily due to the use of a reflective concave mirror.

While the typical unstable laser resonator arrangement may be suitable for certain applications, the inventor of the present application has improved upon the efficiency of the typical system. The present invention provides diffraction limited performance with the simplicity of earlier unstable laser resonator designs like the confocal unstable laser resonator. Moreover, the present invention may also be applied to low gain lasers where other unstable laser resonator designs are not easily applied.

Therefore, an object of the present invention is to provide an unstable laser resonator that does not need elaborate optical configurations or lossy intra-cavity apertures to reduce the number of modes that are allowed to oscillate within the laser cavity.

A further object of the present invention is to provide an unstable laser resonator with an increased energy output.

These and other objects are attained in the unstable laser resonator of the present invention. The laser resonator of the present invention is able to reduce the number of transverse modes which oscillate within the laser cavity, without using complicated optical schemes. The objects of the invention are attained by simultaneously achieving small fresnel number conditions associated with low order mode laser beams and large fresnel number conditions associated with high laser energy extraction, resulting in an output beam of greater efficiency and low divergence.

The present invention of a laser resonator includes a laser cavity, a gain medium disposed within the cavity, a first reflector and aperture positioned adjacent one end of the laser cavity, and a second reflector positioned adjacent an opposite end of the laser cavity. While the first reflector may be shaped in various ways, it is shown for illustrative purposes throughout the specification as being, for example, a plane surface, a convex surface, or a concave surface. The surface contour of the reflector will in large part be dependent upon the gain medium.

For a diffraction limited output beam from the laser cavity, the following formulas may be applied to establish the optical components and their separation within the laser cavity:

$$L = \frac{\pi \omega_0^2}{\lambda}, \quad R = \frac{2L\omega_0}{(D - 2\omega_0)}, \quad Foc = 2\left(L + \frac{R}{2}\right)$$

L represents the diffraction limited rayliegh length of the cavity for a given beam waist radius $\omega_0$ and $\lambda$ is the wavelength of the laser. R represents the radius of curvature of the high reflecting mirror and $F\infty$ the focal length property of the output mirror/lens element. In the simplest configuration of the present invention the output mirror/lens element can be a single optical element. This element may be a meniscus lens with one surface acting as a mirror and the other surface acting as a lens. The radius of curvatures $R_1$ and $R_2$ for this optical element are defined as follows:

$$R_2 = \frac{Foc}{\left(\frac{1}{n-1} + \frac{1}{2}\right)}$$

The second reflector, also referred to as the output reflector or mirror, is also not limited to one specific shape. For example, the output mirror may be any combination of concave, plano or convex surfaces so long as the light reflected back into the cavity and out of the cavity is collimated.

The purpose of the two opposing mirrors is to reflect the light within the gain medium until the light beam has reached an energy threshold condition to escape the output mirror. The function of the aperture adjacent to the first mirror is to prevent slightly higher order mode light from entering the cavity and being amplified through waveguiding affects from the walls of the gain medium. Diffraction limited performance may be attained without the use of the aperture, however. The present invention has the additional feature of collimating the output beam as it escapes the output mirror. The output mirror both reflects the light within the cavity and collimates the light as it escapes.

The present invention creates an output beam with diffraction limited light, which allows for smaller focal spots to be generated with simple lenses. The result is greater cutting and drilling efficiency realized due to increase in energy density at the focal point. As an example, the present invention has increased drilling and cutting speeds in aluminum, various ceramics, silicon, stainless steel and other metals by more than an order of magnitude.

The unstable laser resonator of the present invention may be used in numerous high gain laser devices, such as excimer lasers, Q-switched solid state lasers, $CO_2$ TEA lasers, dye lasers, nitrogen lasers, copper vapor lasers and the like. Additionally, the feedback mechanism of the output mirror is such that low gain lasers could be made to operate at their diffraction limit by proper selection of curvature and reflectivity of the optics.

Other objects, advantages and novel features of the present invention will be apparent upon consideration of the following description of the preferred embodiments and accompanying drawings.

DETAILED DESCRIPTION OF THE PREFERRED EMBODIMENTS

Figure 1:
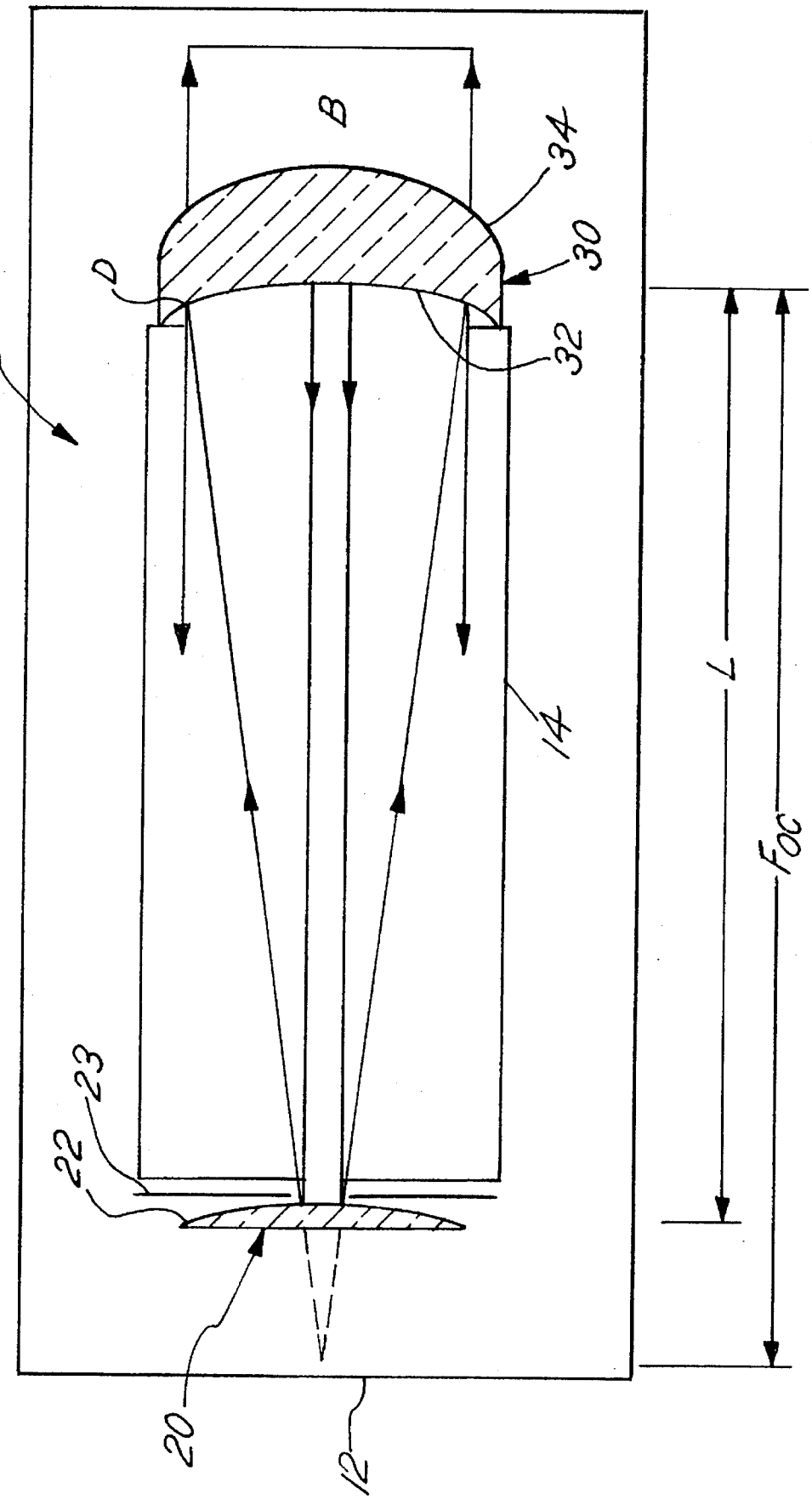
FIG. 1 is a schematic view of an embodiment of the unstable laser resonator of the present invention utilizing a meniscus output mirror/lens.

Schematic views of several embodiments of the laser resonator of the present invention are shown in FIGS. 1–6. Laser resonator 10 includes laser cavity 12, which houses gain medium 14, first mirror 20, an aperture 23 and second mirror 30. Laser resonator 12 also includes an excitation source (not shown) as is well known in the art. The excitation source produces photons which are reflected within the laser cavity between the two mirrors.

As an example, gain medium 14 may comprise a crystal, gas or liquid. However, several suitable materials may be used to form gain medium 14 and the present invention is not to be limited by the use of any particular material.

First mirror 20 is located at one end of laser cavity 12. First mirror 20, also known as first reflector 20, includes a first surface 22. First surface 22 is directed substantially towards laser cavity 12 and gain medium 14. First mirror 20 is a high reflecting mirror, as is well known in the art. First surface 22 may be coated with silver, a dielectric, or some similar coating to provide the high reflective properties.

Figure 3:
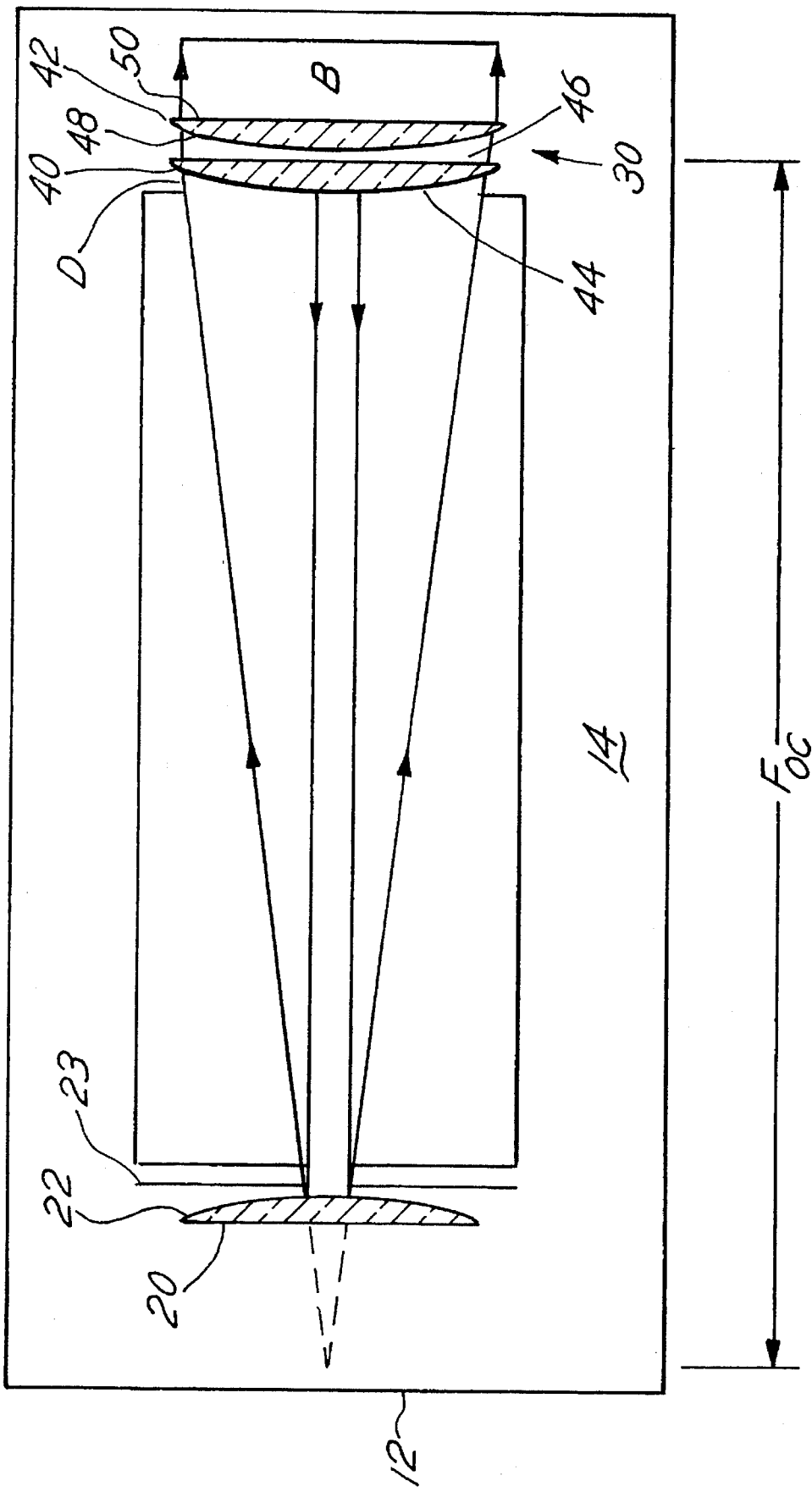
FIG. 3 is a schematic view an embodiment of the unstable laser resonator of the present invention utilizing a convex-plano output mirror lens combination.
Figure 4:
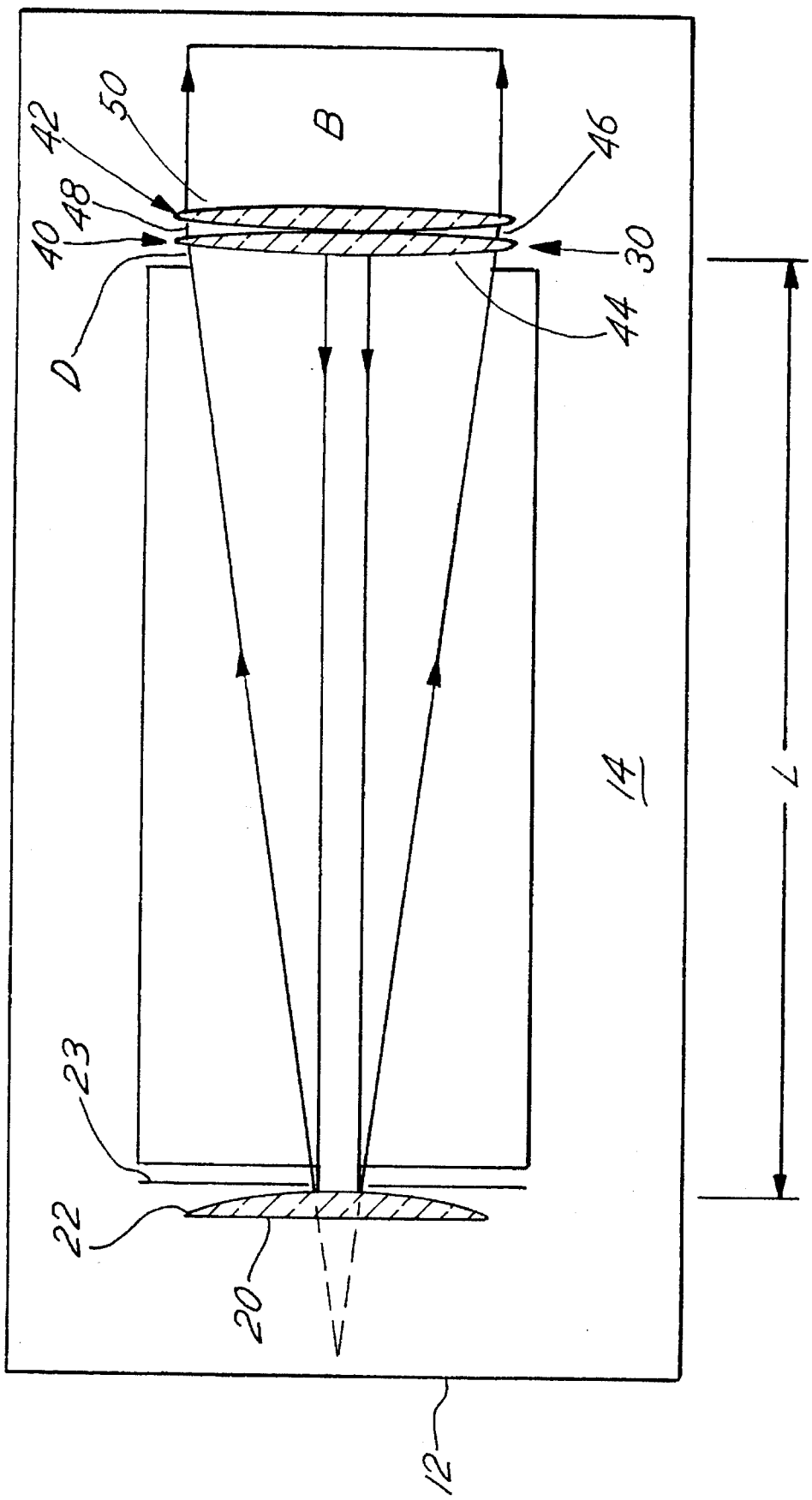
FIG. 4 is a schematic view an embodiment of the unstable laser resonator of the present invention utilizing a equi-convex output mirror lens combination.
Figure 5:
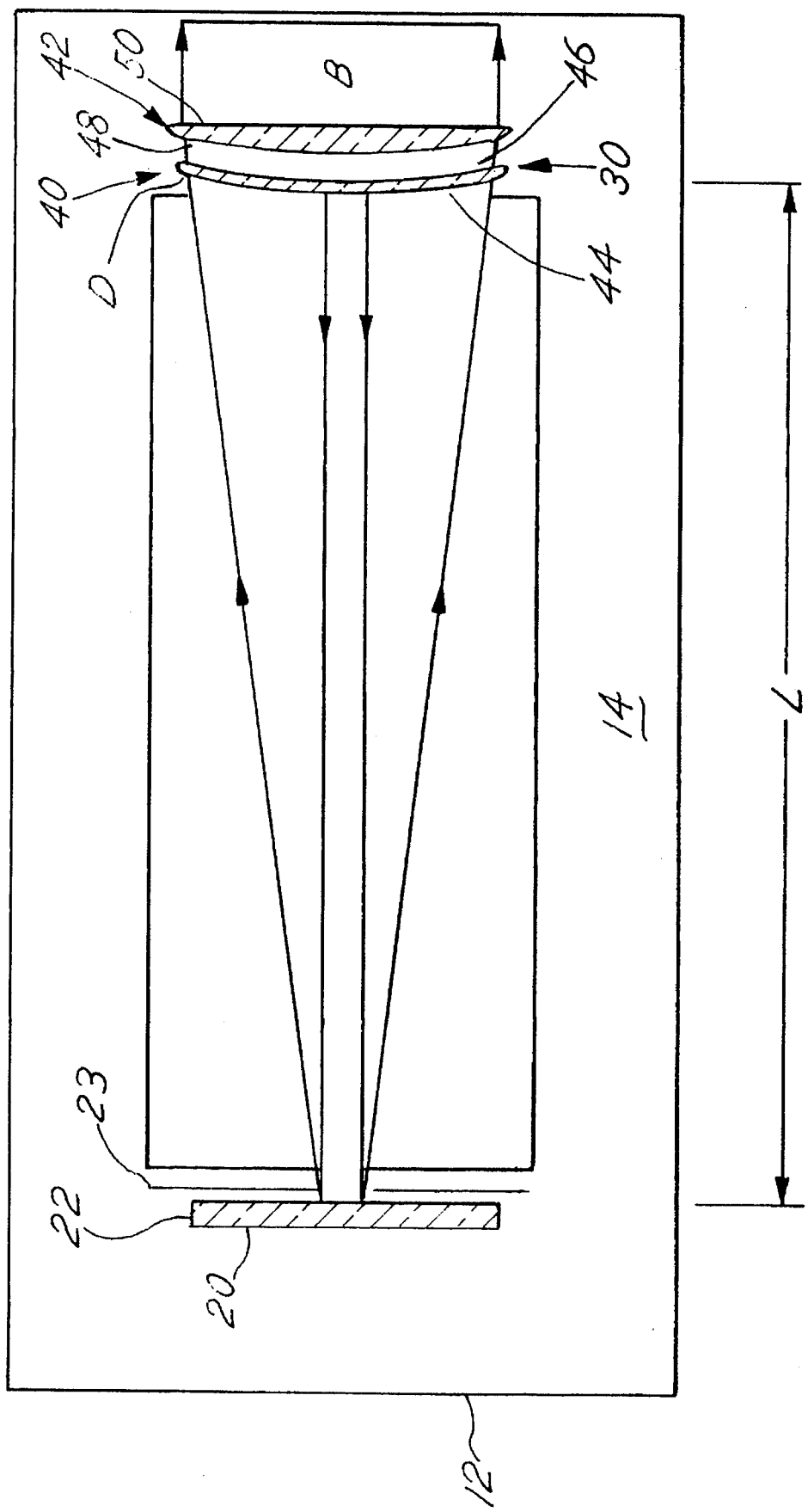
FIG. 5 is a schematic view an embodiment of the unstable laser resonator of the present invention utilizing a plano high reflector and a meniscus mirror and a plano-convex lens combination.
Figure 6:
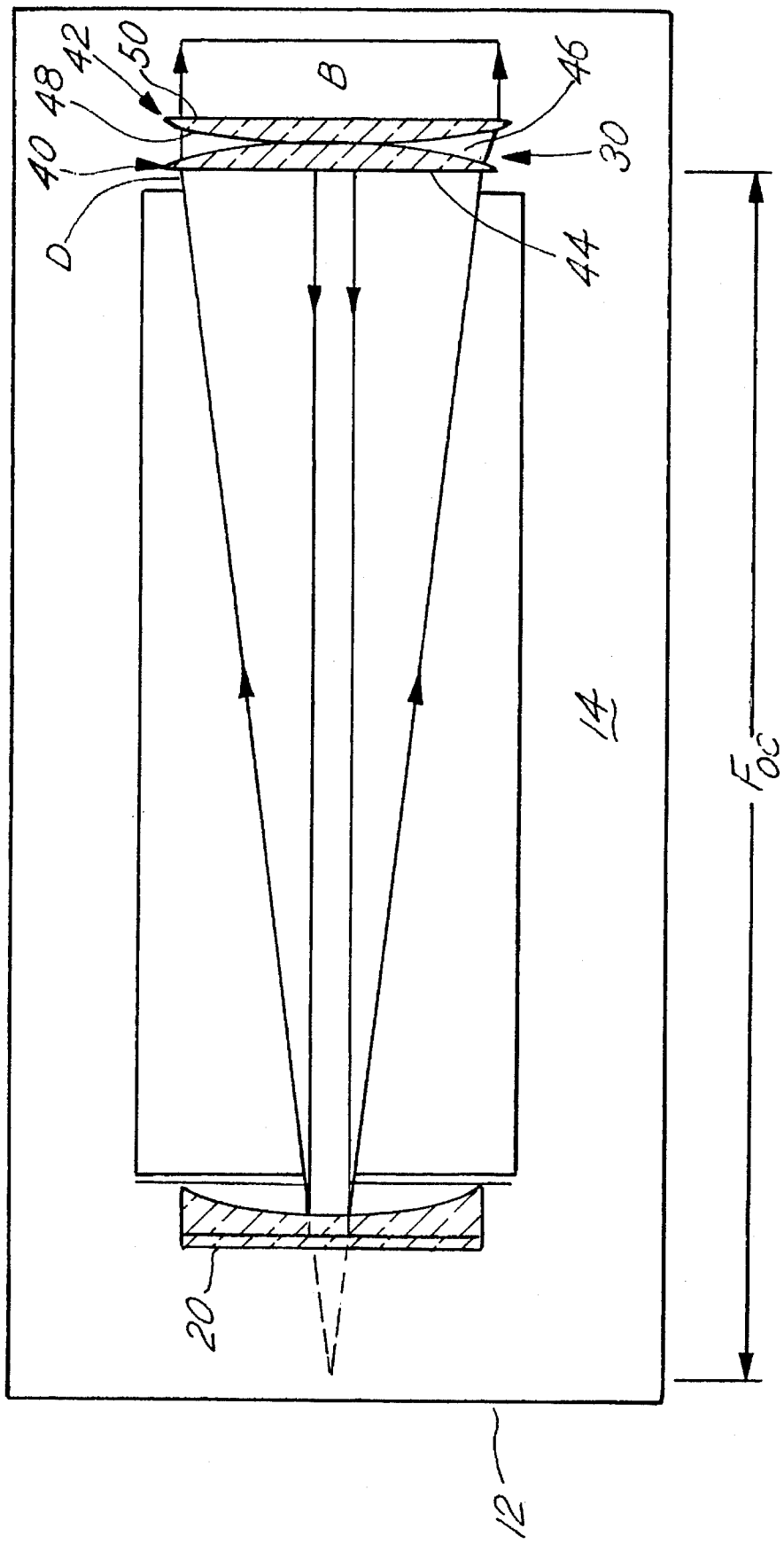
FIG. 6 is a schematic view an embodiment of the unstable laser resonator of the present invention that utilizes a plano-concave mirror as the first reflecting mirror and a pair of plano-convex mirrors/lenses as the output mirror.

First mirror 20 of the present invention is configured to be a diverging optical element; either as a reflecting convex surface as shown in FIGS. 1–4, as a plano element shown in FIG. 5, or as a plano-concave optical element as shown in FIG. 6. In any case, the light striking mirror 20 diverges as it reflects back toward gain medium 14. In some cavities, dependent upon the gain medium, it may be beneficial to place an aperture 23 adjacent to mirror 20 so as to prevent high divergent light from reentering gain medium 14 due to waveguiding effects. If the first surface 32 of the output mirror 30 is convex or has negative mirror properties, then surface 22 of mirror 20 can be plano as depicted in FIG. 5. In this scenario, the aperture is used to block higher order light. In FIG. 1, first surface 22 is substantially convex. The divergent property of mirror 20 is in contradistinction to the typical unstable laser resonator, which utilizes a high reflecting concave surface to collimate the light within the cavity.

Second mirror 30, also known as the output mirror, is positioned within laser cavity 12 opposite first mirror 20. Output mirror 30 acts as both a regenerative and a transmissive interface for laser cavity 12. Second mirror 30 is a lens/mirror element comprising surface 32 substantially facing laser cavity 12 and gain medium 14, and surface 34 substantially facing away from the laser cavity and gain medium. Surface 32 may be coated for partial reflectivity, dependent upon the gain of gain medium 14. Surface 34 is preferred to be antireflection coated for the light being amplified. Lens/mirror element 30 may also comprise two independent optical elements as depicted in FIGS. 2–6.

A low order or single order mode photon originates within the gain medium close to surface 32 of output mirror 30. The photon propagates substantially towards laser cavity 12 and gain medium 14. A diffraction limited rayliegh length condition L is established between mirror surfaces 22 and 32 by the following equation:

$$L = \frac{\pi \omega_0^2}{\lambda}$$

Where $\omega_0$ represents the radius of the beam waist and the lowest fresnel number of the cavity to produce a diffraction limited beam. L also represents the cavity length. The radius of curvature for mirror 20 is determined by the following:

$$R = \frac{2L\omega_0}{(D - 2\omega_0)}$$

Where D represents the output aperture of the laser cavity. The lens value of the lens/mirror element 30 is such that the focal length of the mirror surface 32 is:

$$Foc = 2\left(L + \frac{R}{2}\right)$$

Photons which are contained within $2\omega_0$ propagate toward mirror 20 where they diverge back through gain medium 14 to expand to the full cross-sectional area of the gain medium and pass through surface 32 and strike surface 34. A percentage of the light passes through surface 34 and another percentage is reflected back into the laser cavity by surface 32, based upon the reflectivity of surface 32. The divergent light striking surface 32 is collimated by surface 32 and made available to again seed the gain medium for further amplification while retaining the low order mode quality originally established. The light exiting lens/mirror element 30 passes through surface 34 which has a radius of curvature based upon the following equation:

$$R_2 = \frac{Foc}{\left(\frac{1}{n-1} + \frac{1}{2}\right)}$$

and therefore collimates the light as it completely exists the laser cavity. The optical material of element 30 has an index of refraction of n.

As is shown in FIGS. 2–6, output coupler 30 may comprise two separate optical elements, 40 and 42. For exemplary purposes only, FIGS. 2–6 show various geometric configurations that elements 40 and 42 may take. The present invention is not to be limited to the specific combinations of output coupler 30 shown.

Figure 2:
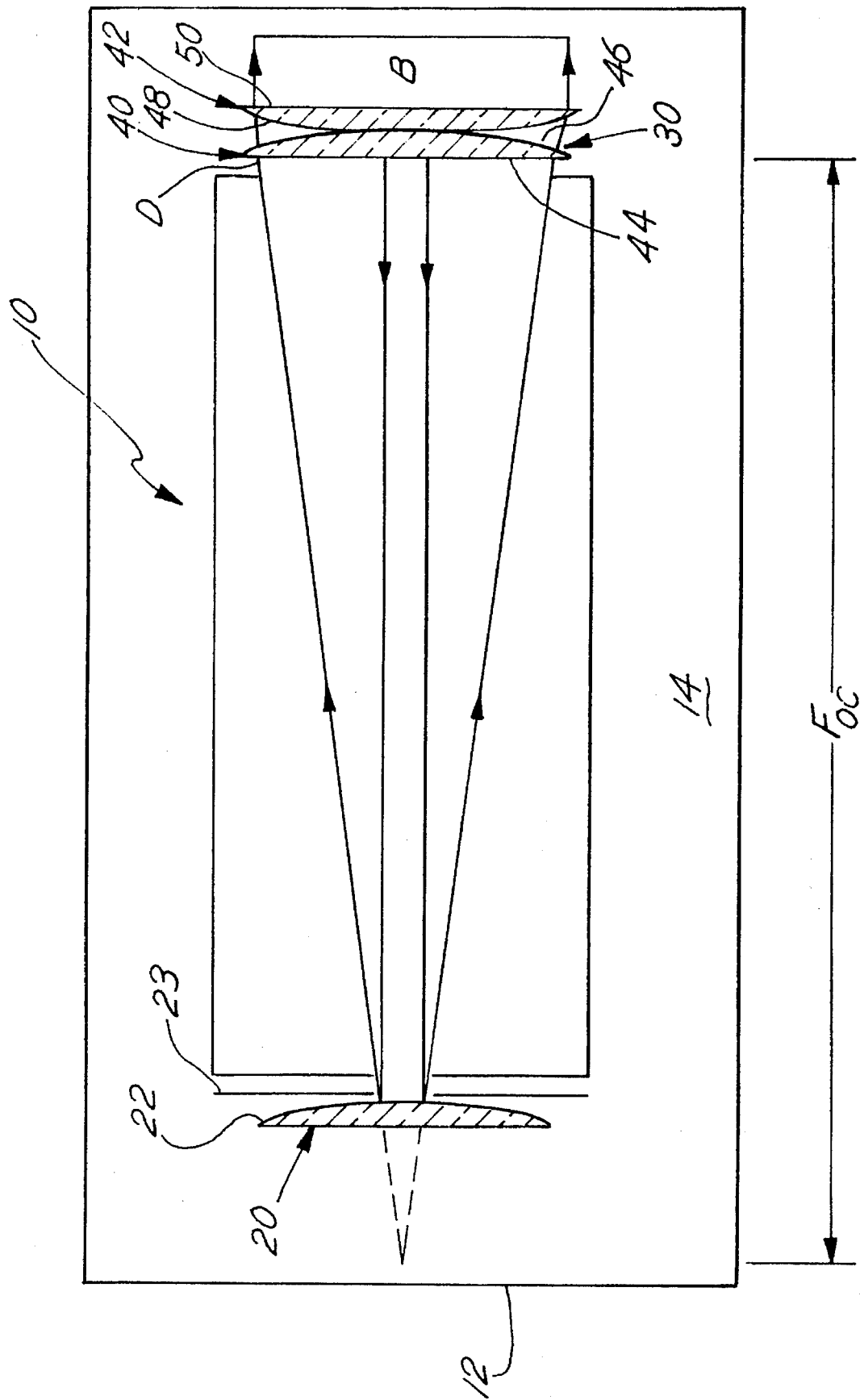
FIG. 2 is a schematic view an embodiment of the unstable laser resonator of the present invention utilizing a plano-convex output mirror lens combination.

In FIG. 2, output coupler 30 includes plano-convex mirror 40, and opposing plano-convex mirror 42. Mirror 40 includes first surface 44 and second surface 46; mirror 42 includes first surface 48 and second surface 50. In this configuration, divergent light striking surface 44 is collimated by striking surface 46 and reflected back towards gain medium 14 and made available to again seed the gain medium for further amplification. The light which exits the cavity is collimated by passing through surfaces 48 and 50.

FIGS. 3–5 show additional exemplary embodiments of output coupler 30. In FIG. 3, mirror 40 and mirror 42 are both convex-plano mirrors. In FIG. 4, both mirrors 40 and 42 are equi-convex mirrors. In FIG. 5, the output mirror comprises meniscus mirror 40 and plano-convex mirror 42.

FIG. 6 includes output coupler 30 utilizing opposing plano-convex mirrors. However, in this embodiment, first mirror 20 is shown as a plano-concave mirror, with the plano side coated for high reflectivity, and the concave side being antireflection coated. In this configuration, mirror 20 is acting like a double concave or negative lens. When using first mirror 20 of this geometry, aperture 23 is utilized to block higher order light.

Thus, as is shown in FIGS. 1–6, both surface 22 of first mirror 20 and first surface 32 of second mirror 30 substantially restrict the number of modes which can oscillate in the laser cavity. As light travels between the two mirrors, there is substantially no converging effect on the light, thus forcing higher order mode light out of the cavity. Mirror surface 22 is the primary filter in the cavity that restricts the number of modes that can oscillate. This results in a relatively high diffraction loss within the cavity for high divergent light and low loss for diffraction limited or on-axis beams. The output beam is designated throughout the various figures by the letter B.

What is claimed is:

1. A laser resonator, comprising:

a laser cavity;

a gain medium disposed within the laser cavity;

a first mirror disposed adjacent one end of the laser cavity;

a second mirror element disposed adjacent an opposite end of the laser cavity;

wherein the second mirror element includes two surfaces, the first surface substantially facing the laser cavity and the second surface substantially facing away from the laser cavity, the first surface acting as both a regenerative and transmissive interface for the laser cavity and the second surface collimating the transmitted light as it exits the cavity;

the reflecting surface substantially facing the laser cavity, wherein the reflecting surface is a diverging surface; and wherein the first surface of the second mirror is a positive surface, such that the separation between the reflecting surface of the first mirror and the first surface of the second mirror is $L=(\pi\omega^2_0)\lambda$, where $\omega_0$ is the radius of the laser beam waist and $\lambda$ is the wavelength of the laser.

2. The laser resonator according to claim 1 wherein the radius of curvature of the first mirror is $R=(2L\omega_0)/D-2\omega_0$ where D is the diameter of the output aperture of the laser resonator and wherein the first mirror is a negative mirror element which causes light to diverge when incident upon it.

3. The laser resonator according to claim 2 further including an aperture placed between the first mirror and the gain medium.

4. A laser resonator, comprising:

a laser cavity;

a gain medium disposed within the laser cavity;

a first mirror disposed adjacent one end of the laser cavity;

a second mirror element disposed adjacent an opposite end of the laser cavity;

wherein the second mirror element includes two surfaces, the first surface substantially facing the laser cavity and the second surface substantially facing away from the laser cavity, the first surface acting as both a regenerative and transmissive interface for the laser cavity and the second surface collimating the transmitted light as it exits the cavity; and wherein the first surface of the second mirror has a radius of curvature of $R_1$ where $R_1=2F\infty$, where $F\infty=2(L+R/2)$.

5. A laser resonator, comprising:

a laser cavity;

a gain medium disposed within the laser cavity;

a first mirror disposed adjacent one end of the laser cavity;

a second mirror element disposed adjacent an opposite end of the laser cavity;

wherein the second mirror element includes two surfaces, the first surface substantially facing the laser cavity and the second surface substantially facing away from the laser cavity, the first surface acting as both a regenerative and transmissive interface for the laser cavity and the second surface collimating the transmitted light as it exits the cavity; and wherein the second mirror has a radius of curvature of $$R_2 = \frac{Foc}{\left(\frac{1}{n-1}+\frac{1}{1/2}\right)}.$$

6. A laser resonator, comprising:

a laser cavity;

a gain medium disposed within the laser cavity;

a first mirror disposed adjacent one end of the laser cavity;

a second mirror element disposed adjacent an opposite end of the laser cavity;

wherein the first mirror includes a first surface thereon substantially facing the laser cavity, such that the first surface is a diverging surface; and wherein the first surface of the first mirror has a radius of curvature equal to $(2L\omega_0)/D-2\omega_0$ where D is the diameter of the output aperture of the laser resonator.

7. The laser resonator according to claim 6, wherein the distance between the first mirror and the second mirror is $(\pi\omega^2_0)/\lambda$, where $\omega_0$ is the radius of the laser beam waist and $\lambda$ is the wavelength of the laser.

8. The laser resonator according to claim 7 wherein the second mirror includes a first surface substantially facing the laser cavity and a second surface substantially facing away from the laser cavity, wherein the first surface has a radius of curvature $=2F\infty$, where $F\infty=2(L+R/2)$ and wherein the second surface has a radius of curvature of $$\frac{Foc}{\left(\frac{1}{n-1}+\frac{1}{1/2}\right)}.$$

* * * * *